United States Patent
Maroy et al.

(12) 
(10) Patent No.: US 6,616,751 B1
(45) Date of Patent: Sep. 9, 2003

(54) WATER-SELECTIVE CEMENTING COMPOSITION

(75) Inventors: Pierre Maroy, Buc (FR); Jack Maberry, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/711,612

(22) Filed: Nov. 13, 2000

(51) Int. Cl.⁷ .............................................. C04B 24/02
(52) U.S. Cl. ...................... 106/696; 106/724; 106/727; 106/802; 106/808; 106/823
(58) Field of Search .................................. 166/293, 285; 106/696, 724, 727, 802, 808, 823

*Primary Examiner*—Paul Marcantoni
(74) *Attorney, Agent, or Firm*—Thomas O. Mitchell; Catherine Menes; Brigitte Jeffery

(57) ABSTRACT

A cementing composition comprising a hydraulic cement powder dispersed in a solvent that is miscible both with water and hydrocarbons to make a slurry. The cement powder can be made up simply of hydraulic cement materials or can be a mixture of such materials with particles that are inert or reactive with cement. The composition can also include surfactants or retarders. The composition is used to plug water production in a well while leaving hydrocarbon production unaffected.

24 Claims, No Drawings

WATER-SELECTIVE CEMENTING COMPOSITION

FIELD OF INVENTION

The present invention relates to cementing compositions and slurries that are useful for water control in oil and gas wells. In particular, the invention relates to such compositions for use in squeeze cementing operations.

BACKGROUND OF THE INVENTION

One of the principal reasons of the abandonment of producing gas or oil wells is the increased production of water which renders continued exploitation of the well unprofitable. This water can come from the underground formation constituting the gas or oil reservoir. There are many different cases that can arise. Amongst the most frequent are the following. The rise of the water level can result from the simple progressive depletion of the producing oil and/or gas layer(s). This is a general rise of level of water in the formation. If the well is cased, the water level eventually reaches the level of perforations in the casing adjacent the gas or oil producing zone(s). If the well is completed without lining (barefoot), the general rise of the level of water leads a greater part of the well being open to water and the proportion of water in the aggregate output increases. A rise in the level of water can occur locally, around the producing zones. This is due to the difference in pressure between the pressure of the fluids in the formation and the pressure maintained in the well to obtain the production (called "water coning"). This local rise can be also supported by fractures with strong dip.

The increase in water can also result from water injection by the operator. This water injection, sometimes called "water flood", is achieved by the use of water injection wells and the objective is to maximize the oil recovery. The sweeping of the formation by the water flood is almost always irregular and the water produced by the wells of production increases, either as a result of preferentially producing formation water or producing the injection water itself. Lastly, when there is damage to cement used together with casing for zonal isolation, water can come from a geological layer different from the desired producing layer.

In such cases, the current technique for remediation consists plugging specific zones with organic or mineral gel or cement grouts. The cement used can be a construction cement, an oilfield cement or a microcement useful for penetrating narrower fractures. These various techniques present advantages and disadvantages. According to the case, these can be used separately or together. However, all these techniques present the same disadvantage: they are not selective. The use of these cements or gels can result in plugging the water flow, which is desirable, or plugging the gas or crude oil flow, which is undesirable. Consequently, it is desirable to place these fluids in a precise way. This requires a very good identification of the phenomenon leading to the production of water but this is not always possible because of the depth of the wells and the frequent presence of metal casing, which masks the phenomena. Cement placement is therefore always very difficult and hazardous owing to the fact that there is no certainty in the position of the water flow to be stopped.

For this reason, it has been sought to develop formulations containing cement which would only remain where water is actually produced. This is the object of the two U.S. Pat. No. 5,238,064 (1993) and U.S. Pat. No. 5,348,584 (1994). In these two patents, the inventor proposes to disperse cement or microcement in a hydrocarbon phase. Surfactants are added before or during dispersion. These processes are industrial. In spite of their theoretical advantage, they are rarely used, because the rate of success is only very moderate. Bringing the particles suspended in a hydrocarbon into contact with water is difficult. The presence of hydrocarbons in the suspension is source of pollution and thus undesirable in many parts of the world.

SUMMARY OF THE INVENTION

The present invention relates to cementing compositions and slurries that are useful for water control in oil and gas wells.

DETAILED DESCRIPTION OF THE INVENTION

The present invention comprises dispersing a hydraulic cement powder in a solvent that is miscible both with water and hydrocarbons to make a slurry. The cement powder can be made up simply of hydraulic cement materials or can be a mixture of such materials with particles that are inert or reactive with cement as disclosed in EP 0 621 247, EP 0 748 782, WO 00 34199 or EP 0 922 013.

The various cement materials can be of any nature, Portland cement, optionally including pozzolans such as for example blast furnace slags or fly ash or cenospheres, or natural materials such as pozzolan or calcined clays. One can also use aluminate cements (Fondu Lafarge), plaster, Sorel cement, pozzolanic activated cements or all other composition with hydraulic set properties (hereinafter simply called "cement"). The maximum size of the cement particles is of no importance on the level of selectivity, it can therefore be selected according to the size of fractures to be plugged. One can use, as an example ordinary cement, of which more than 90% of the particles have a size lower than 100 microns, or well microcement, of which more than 90% of the particles have a size lower than 10 microns or less, or cements of intermediate size, or mixtures of the preceding.

When using formulations including, in addition to the cement particles previously defined, the different particles according to the disclosure of EP 0 621 247, EP 0 748 782, WO 00 34199 or EP 0 922 013, care should be taken that the added sub-micron particles are not in suspension in water. Particles of sizes lower than one micron have a tendency to agglomerate in a dry state because of the interparticulate forces of attraction. It can then become very difficult or impossible to re-disperse them. For this reason, they are presented usually in the form of suspension in a liquid. Such fine particles are used as suspended in oil or a solvent miscible with the solvent being used to manufacture the slurry. Such suspensions of mineral particles exist on the market as pigments for paints.

The solvent miscible with water and hydrocarbons used to make the slurry can belong to many families of temperature stable products, such as ethers and polyethers (e.g. tetrahydrofurane, dioxane, ethylene glycol monoalkyl ethers or poly-ethylene-glycol monoalkyl ethers), or anhydrous alcohols of low molecular mass (e.g. methanol, ethanol or propanols), ether-alcohols e.g. 2-butoxyethanol, amides (e.g. N, N-dimethyl- or N, N-diethylformamide, N, N-dimethyl- or N, N-diethylacetamide or N-methylacetamide). Generally, the solvent will be selected from products considered as miscible with water or very soluble in benzene in the tables of physical constants such as those published in reference works such as the "CRC Handbook of Chemistry and Physics". Either pure solvents or mixtures of the solvents can be used. In particular, slightly volatile solvents having a good temperature stability and strict environmental acceptability are preferred.

Surfactant solids can be added to disperse the solid particles. According to solvent selected, polynaphtalenesulfonates, polymelaminesulfonates, substituted succinimides or substituted sulfosuccinimides can be used. These products will typically not be used in aqueous solution, but either in the solid state or prediluted in one of the anhydrous solvents proposed above. Normally, it will not be necessary to add retarder to the cement as there is no water in the slurry to set the cement during placement and as a rapid set is desired after placement where the slurry is in contact with water. However if it is desired to add a retarder for specific water control intervention, lignosulfonate, glucoheptonic acid or salts, or derivatives of glyceroheptonates, a mixture of lignosulfonate with a gluconate, diphenols such as cathechol, hydroquinone, or resorcinol can be used. All these retarders are well-known in this field.

The slurry typically contains from 20% to 65% by volume of solid products. When the formulation contains cement of normal particle size (without using the teaching of EP 0 621 247), the slurry typically contains from 20 to 50% of solid. When using cement of normal particle size, but by applying the teaching of EP 0 621 247, the range is extended to 65% by volume of solid. When the formulation uses microcements the range is typically 15 to 47% by volume of solid in suspension. While formulating with microcement according to WO 00 34199, i.e. by adding submicron particles, the quantity of solid in suspension can be extended to 55% by volume of solid.

The slurry is used in the manner of a squeeze cement (forced injection of slurry) in the well. Where it meets water, the slurry sets and plugs the cracks, slits or porosity from which the water is produced. There is no special problem for wetting of the particles, particularly those of cement, because of the compatibility of solvent used with water. Where the slurry meets oil or condensates of oil, there is no set, because due to the compatibility of solvent with oil or the condensates, the slurry is diluted and ejected. The cracks, slits and pores, from which the crude oil is produced before the intervention, remain exposed and oil or the condensates can still flow therethrough.

The preceding description provides general details of the manner in which water production in a well can be shut off selectively. In the following examples, specific formulations are described which can be used in this manner. Variations can be made while still staying within the scope of the invention.

EXAMPLE 1

In this example, a microcement is dispersed in a commercial solvent comprising 99% of 2-butoxy ethanol and approximately 1% of ethane 1–2 diol. This solvent is miscible with water as well as with hydrocarbons. The microcement is a commercial product, SPINOR A12 produced by Origny Cements. In this cement, the quantity of particles of size higher than 12 microns is not measurable and that of particles of size lower than 4 microns is higher than 50%. The slurry is mixed in a warring-blender according to the API procedure, 560 g of microcement with 420 ml of solvent. In this example no dispersing product is added. The mixture is achieved very easily according to the API criteria, which is somewhat surprising. The resulting fluid has a behaviour that is very slightly viscoelastic with nearly Newtonian behaviour. A threshold of flow of 1.1 Pascals and a plastic viscosity of 31.6 mPa.s (milliPascals.second) is obtained. The stability of the suspension is very good and less than 0.4% free solvent appears at the end of 2 hours using the API method of measurement of free water. No setting is observed with this slurry even after several weeks of storage away from moisture. If 45 ml of water, i.e., 7.5% of the volume of the suspension, which is insufficient for hydrating all of the cement, is added to this mixture and the mixture is very gently homogenised with a spatula to simulate the mixing of the two fluids in the well, the mixture viscosities very quickly in less than 30 seconds to make a very thick gel having strong elastic properties. Alternatively, if 45 ml of diesel oil are added to the initial suspension of microcement in solvent, the fluidity of the suspension increases considerably and viscosity falls to 20 mPa.s.

Thus, when squeezing the slurry onto the borehole wall and into porosity and fractures from which water is produced, the mixture will immediately gel and the cement sets to block the production of water. Alternatively, when the slurry is placed in parts of the borehole from which liquid hydrocarbons are produced, the viscosity of the mixture will be reduced, and the mixture diluted and carried out of the well. Thus, the production of hydrocarbons will not be prevented.

EXAMPLE 2

In this example, the solvent and microcement are the same as in Example 1. 735 g of microcement are mixed with 363 ml of solvent without using a dispersant. The mixture is easily accomplished and the fluid is perfectly stable over two hours. The fluid has a very slight viscoelastic behaviour with a threshold of flow of 0.8 Pa and a plastic viscosity of 115.8 mPa.s. As in the preceding example, water is added to the suspension (64 ml) and the same method of mixing is performed. Thickening is extremely significant in under 15 seconds and the gel has very strong elastic properties. To check that a subsequent addition of water does not destroy gelling, 131 ml more water are added. The total quantity of water (195 ml) is then sufficient for the hydration of all of the cement present. This second mixture is more difficult. Once the gel is broken, the slurry becomes less thick because of the effect of the additional dilution, but thirty seconds later gelation reoccurs and the consistency reaches the preceding levels.

195 ml of the slurry is placed in a closed plastic cube. This cube is placed in a bain-Marie at 50° C. Setting begins in less than 6 hours, despite the fact that in a sealed cube solvent cannot diffuse out of cement as it would actually do in the practical application. At the end of 12 hours, the compressive strength of the cube is 5.5 MPa. Thus it can be seen that in this application, after the initial hydration and the formation of gel, while the gel continues to hydrate, the gel will not be broken before the cement sets. Alternatively, if 64 ml of gas oil are added instead of water, the viscosity of the suspension falls dramatically from 115.8 mPa.s to 45.3 mPa.s.

By way of comparison, a suspension was prepared as described in the U.S. Pat. No. 5,238,064 (1993) and U.S. Pat. No. 5,348,584 (1994) and more particularly as in the 2b example of U.S. Pat. No. 5,348,584. 651 g of SPINOR A12, 383 ml of gas oil and 1.1 g of dodecylbenzene calcium sulphonate are mixed. 33 ml of water are then added and the mixture shaken for two minutes as described in the patents. Thickening occurs as described in the patent at the end of 30 minutes. Gellation occurs much more slowly and is much less hard than in the preparations according to the invention described above. Consequently, this cement would have the possibility to be ejected from the formation surface and fractures where it would have been placed. The quantity of water added is at this point insufficient for the hydration of all cement. Adding more water to the gel (as in the mixtures prepared according to our invention described above in which the amount of water added after gelation is sufficient to hydrate all of the cement, i.e. 130 ml giving a total of 163 ml), to enable the hydration of all the cement appears impossible in spite of the many methods tested due to inclusion of the gas oil in the gel which makes the gel very hydrophobic. It can be deduced that, in addition to the difficulty in maintaining the gel in place as previously explained, hydration of the slurry of microcement in gas oil will occur very badly and in certain cases may not occur at all. This explains the high rate of failures observed in the treatment of wells with methods according to U.S. Pat. No. 5,238,064 and U.S. Pat. No. 5,348,584.

EXAMPLE 3

A suspension of SPINOR A12 microcement in solvent containing 2-butoxy ethanol is carried out according to the API method. 780 g of microcement and 348 ml of solvent are mixed and no dispersant is added. The mixing is a little more difficult than in the preceding examples. The suspension has a Newtonian rheological behaviour with a viscosity of 276 mPa.s. As in the preceding example, water is added to the suspension. The quantity of water added is 195 ml and, as in the other examples, a gel of very strong consistency develops in less than 15 seconds. A cube is then filled with the gel and is put in a bain-Marie at 50° C. Setting occurs in less than 6 hours.

It will be appreciated that these examples are representative only and that changes can be made to the ingredients and proportions of the mixtures while still staying within the scope of the invention.

What is claimed is:

1. A cementing composition comprising a slurry of
   a hydraulic cement powder containing at least one hydraulic cement; and
   a solvent that is miscible both in hydrocarbons and water;
   wherein the solids content of the mixture is 15% to 65% by volume.

2. A cementing composition as claimed in claim 1, wherein the cement powder also contains one or more particulate additives that are reactive or inert with respect to the cement compound.

3. A cementing composition as claimed in claim 1, wherein the cement powder has a particle size that is predominantly less than 100 microns.

4. A cementing composition as claimed in claim 1, further comprising one or more surfactants.

5. A cementing composition as claimed in claim 1, further comprising a retarder.

6. A cementing composition as claimed in claim 1, wherein the solids content is 20% to 50% by volume.

7. A cementing composition as claimed in claim 1, wherein the solid phase comprises microcement powders, the solids content of the mixture being 15% to 55% by volume.

8. A cementing composition as claimed in claim 1, wherein the solvent is selected from the group consisting of ethers, polyethers, and mixtures thereof.

9. A cementing composition as claimed in claim 8, wherein the solvent is selected from the group consisting of tetrahydrofuran, dioxan, ethylene glycol monoalkyl ethers, poly-ethylene-glycol monoalkyl ethers, and mixtures thereof.

10. A cementing composition as claimed in claim 1, wherein the solvent comprises an anhydrous alcohol.

11. A cementing composition as claimed in claim 10, wherein the anhydrous alcohol is selected from the group consisting of methanol, ethanol, propanols, and mixtures thereof.

12. A cementing composition as claimed in claim 1, wherein the solvent comprises an ether alcohol.

13. A cementing composition as claimed in claim 12, wherein the ether alcohol comprises 2-butoxyethanol.

14. A cementing composition as claimed in claim 1, wherein the solvent comprises an amide.

15. A cementing composition as claimed in claim 14, wherein the amide is selected from the group consisting of N, N-dimethylformamide, N, N-diethylformamide, N, N-dimethylacetamide, N, N-diethylacetamide, and mixtures thereof.

16. A cementing composition as claimed in claim 4, wherein the surfactant comprises a polynaphthalenesulphonate.

17. A cementing composition as claimed in claim 4, wherein the surfactant comprises a polymelaminesulphonates.

18. A cementing composition as claimed in claim 4, wherein the surfactant comprises a substituted succinimide.

19. A cementing composition as claimed in claim 4, wherein the surfactant comprises a substituted sulphosuccinimide.

20. A cementing composition as claimed in claim 5, wherein the retarder comprises a lignosulfonate.

21. A cementing composition as claimed in claim 5, wherein the retarder is selected from the group consisting of glucoheptonic acid and salts thereof.

22. A cementing composition as claimed in claim 5, wherein the retarder comprises a glyceroheptonate derivative.

23. A cementing composition as claimed in claim 5, wherein the retarder comprises a mixture of lignosulphonates and gluconates.

24. A cementing composition as claimed in claim 5, wherein the retarder comprises a diphenol.

* * * * *